Patented June 21, 1932

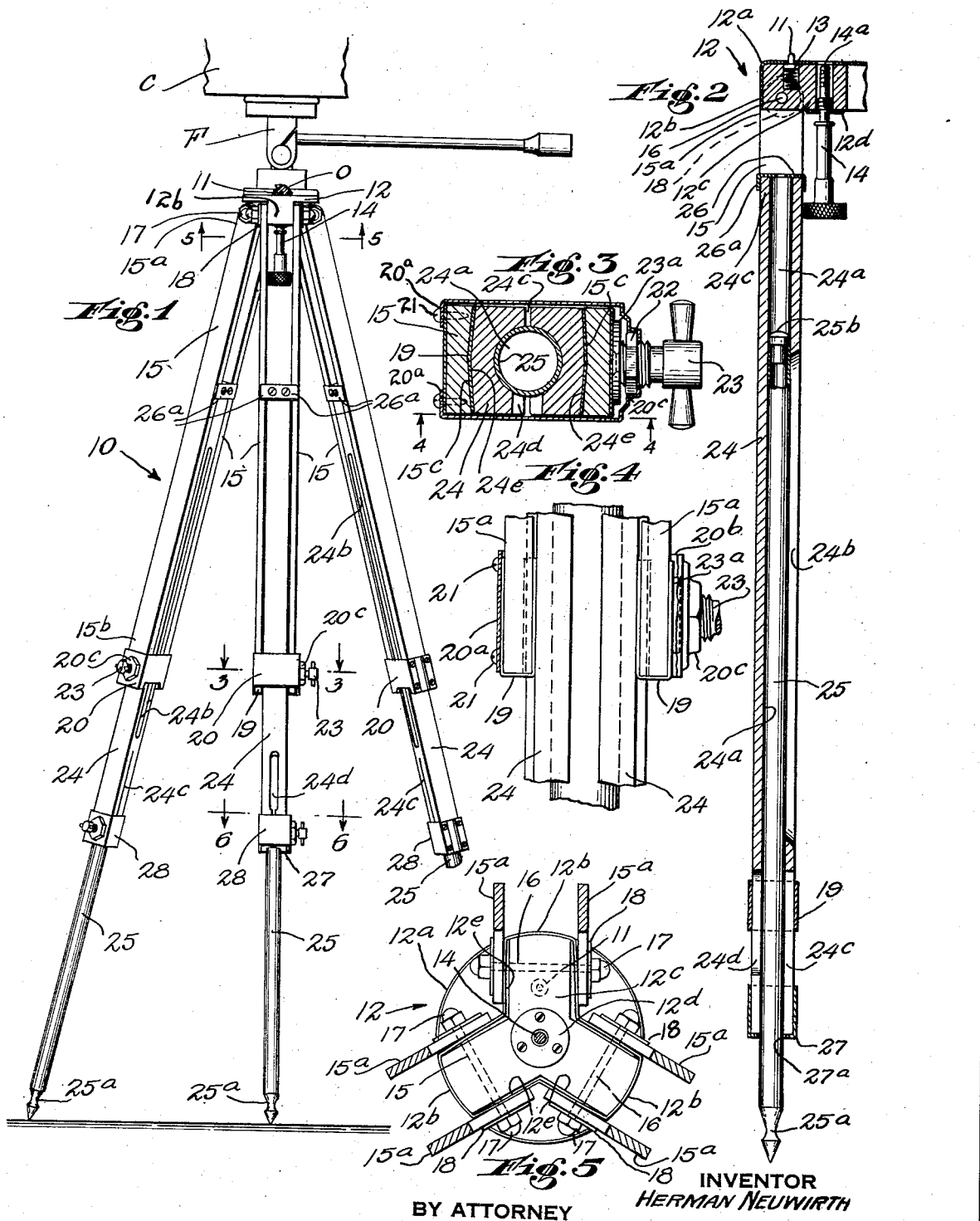

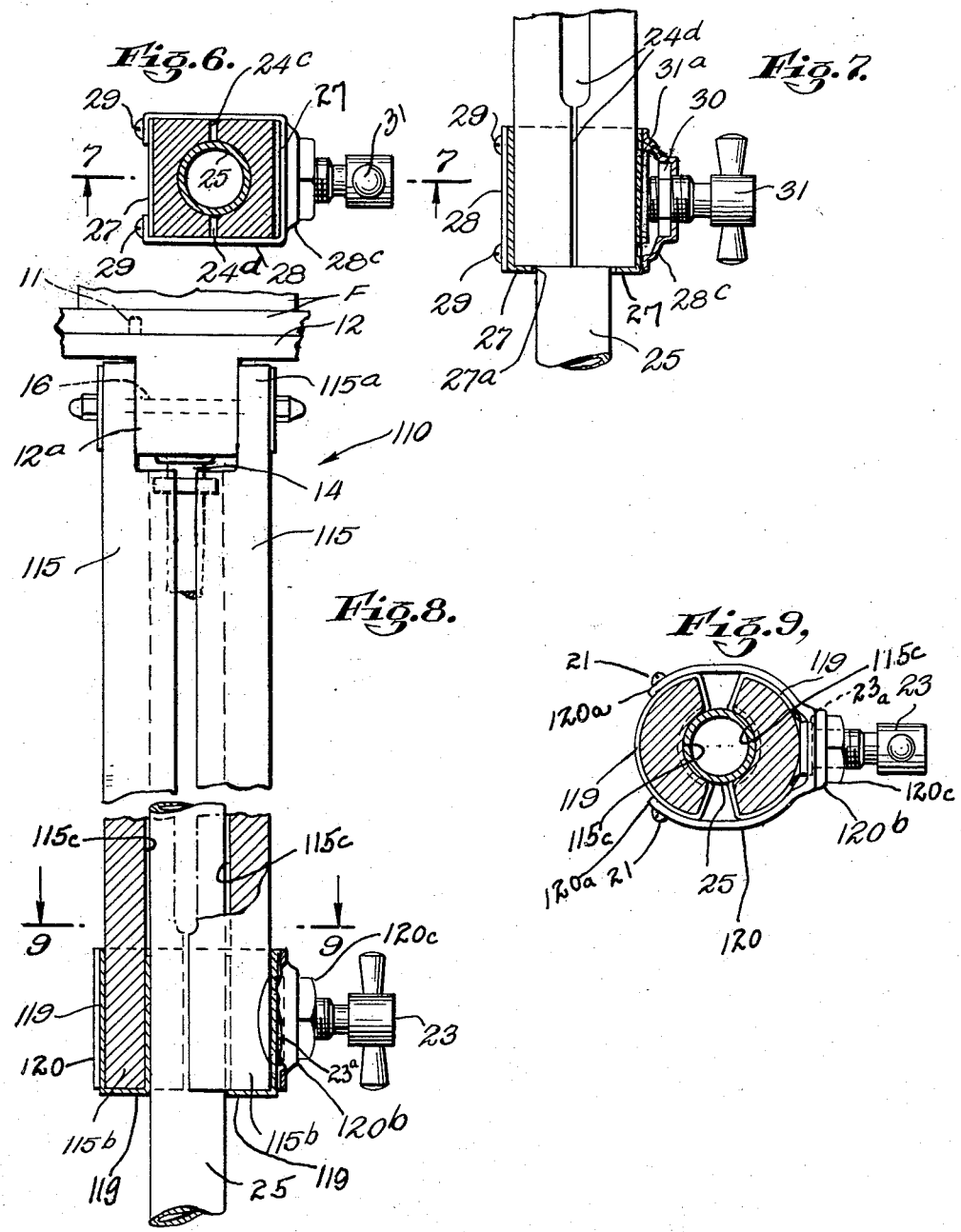

1,863,761

UNITED STATES PATENT OFFICE

HERMAN NEUWIRTH, OF NEW YORK, N. Y.

PORTABLE SUPPORTING DEVICE

Application filed August 27, 1930. Serial No. 478,061.

This invention relates to portable supporting devices and more particularly is directed to a telescopically collapsible tripod of novel construction for mounting a camera or other apparatus.

Among the objects of the invention is the provision of a portable supporting device of the character described comprising few and simple parts assembled to form a neat appearing structure, which shall be light, durable and rigid, which shall be easy and simple to set up and adjust for various heights, which shall be foldably collapsible into a compact body for convenience of transportation and storage, which shall be cheap to manufacture, and practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawings, in which is shown various possible illustrative embodiments of this invention.

Fig. 1 is a front elevational view of the camera tripod embodying the invention set up to provide a camera mounting at a desired level, only a fragmentary portion of the camera being shown.

Fig. 2 is a fragmentary cross-sectional view taken through the head and one of the legs of the improved tripod showing the interior construction.

Figs. 3, 4, 5, 6 and 7 are cross-sectional views, corresponding to cuts taken on lines 3—3 in Fig. 2, lines 4—4 in Fig. 3, lines 5—5 in Fig. 1, lines 6—6 in Fig. 1, and lines 7—7 in Fig. 6, respectively.

Fig. 8 is a fragmentary side elevational view of a camera tripod embodying the invention of a modified construction, and Fig. 9 is a cross-sectional view corresponding to a cut taken on lines 9—9 in Fig. 8.

Referring in detail to the drawings, 10 denotes a camera tripod constructed to employ the invention. The tripod 10 preferably includes wooden members, bound and secured with metallic stamping parts and a few metallic machine parts of simple design telescopically assembled with tubings to provide collapsible leg structures which may be folded into a compact body for transportation and storage, said tripod being adjustable for rigidly mounting a camera or other apparatus at various heights.

As shown in Fig. 1, the tripod 10 has mounted thereon, a panoramic fitting F for swingably supporting a conventional or special type camera C, only a fragmentary portion of the latter being shown. Said fitting F may be constructed in the manner fully described in my co-pending application, Serial No. 370,250, filed June 12th, 1929, now Patent No. 1,854,951 of April 19, 1932, and may be provided with an opening $o$ bored into the under side thereof for receiving a depressible pin 11 which projects up from the circularly shaped head 12 of the tripod. Said pin 11 which is in eccentrical position with respect to a centrally extending stud screw 14, serves to retain the fitting F against rotary movement.

Other forms of panoramic fittings, cameras or other apparatus not provided with openings corresponding to $o$, in register with the pin 11 may be mounted on the head 12 since the pin is readily depressed against the action of the spring 13 so as to form no obstruction.

The head 12 is preferably formed of a stamping or spun shell 12a having a flange portion cut and bent to provide radially extending lug structures 12b. A wooden filler piece 12c extends through said lug structures and has secured thereto a plate 12d which retains the stud screw 14 against detachment. Said screw projects through the wood filler piece and is adapted to have its leading or threaded end 14a engage a standard threaded hole of the panoramic fitting F, or of a camera or other apparatus. Said screw is also provided with a knurled head at its lower end to facilitate tightening and loosening the latter in the well understood manner.

The legs of the tripod 10 are formed of telescopically collapsible sections, the sections attached to the head each comprising a pair of spaced strips 15 which have their upper end 15a hinged on bolts 16 which pass through a lug structure 12b. The bolts 16 retain the strip ends 15a in frictional engagement with the walls 12e of the lug structures 12b. Said walls are formed of the bent flange portions of the shell 12a, which may be made of springy metal thereby providing a resilient pivoting structure.

Each of the bolts 16 may be terminated with a nut 17 and a washer 18 is preferably interposed between each of the nuts 17 and the strip ends 15a as is clearly shown in Figs. 1 and 5. The other or free ends 15b of the strips may each be provided with U-shaped metallic pieces 19 for reinforcing same. Said pieces are interconnected by a metallic stamped band 20 which has its adjacent ends 20a secured in any suitable manner, as by means of screws 21, to the outer side of one of said pieces 19. The side of said band 20b opposite said ends 20a may be provided with a pierced boss 20c which is adapted to retain a nut 22 and into which a wing screw 23 extends for threading into said nut 22. Said wing screw 23 has its inner end provided with a pressure disc 23a and forms with the band 20 a clamping mechanism for use in the manner hereinafter described.

Slideably mounted between each pair of strips 15 is a wooden middle section member 24 which has a passage 24a extending axially therethrough. Each section member 24 is also formed with a slot 24b in one side thereof which extends a substantial distance longitudinally a mid-portion thereof and communicates with said passage to provide clearance for an end section tubing 25 thus eliminating the excessive friction and permitting the free sliding movement of the tubing within the passage 24a.

The ends 24c of the wooden section members 24 extending between the pairs of strips 15 may be provided with metallic stamped caps 26 which form closures for the end of the passages 24a. Said caps are formed with side flanges 26a on opposite edges thereof which serve as guides to retain the section members 24 from leaving the space between the strips 15. The portions of the wooden section members 24 opposite the ends 24c beyond the slots 24b may be slitted as at 24c and 24d adapted to form a clamp. To this end each slitted portion is fitted with a single U-shaped metallic stamping 27 having an opening 27a through which the section tubing 25 passes. A stamped band 28 passes about said slitted portion and is fastened thereto and to said stamping 27 by any suitable means as for example, by screws 29 in the same manner as described above for the band 20. Said band 28 is also provided with a boss 28c which retains a nut 30 and into which a wing screw 31 extends for engaging said nut 30. Said screw 31 carries on its inner end a pressure disc 31a which abuts the stamping 27.

Tubing sections 25 which telescope into the wooden section members 24 may each have a pointed foot 25a at one end for engaging a supporting surface or floor, the other end of which terminates in a rubber tip 25b. Thus the tubing 25 may be reversed to make available either the pointed feet or the rubber tips as desired.

The practical use of the improved tripod will now be apparent. The tripod may be collapsed for transportation or storage by simply telescoping the leg sections into one another after loosening the wing screws 23 and 31 and swinging the said legs together on the hinged connection with the head to form a compact structure in the well understood manner. To set up the tripod, the wing screws 23 and 31 after being loosened, permit the extension of the leg sections to give the tripod a desired height after the legs are spread. Said screws are then tightened to rigidly clamp the leg sections in their set position.

It should be noted that on tightening the wing screw 23, the pressure disc 23a forces the free ends 15b of each pair of the strips together so that the wooden section member 24 is securely clamped therebetween. Likewise, the pressure disc 31a on tightening wing screw 31 presses the clamping portion of the wooden member 24 together for securing the tubing 25 therein. Both pressure discs 23a and 31a bear against metallic surfaces so that the wooden parts of the leg sections are not subjected to the wear by the screwing strains.

Preferably, the flanges 26a on the caps 26 are made relatively wide so as to limit the amount which the wooden section members 24 can be withdrawn from the strips 15. This assures a rigid joint structure when said wooden sectional members 24 are fully extended.

The flange walls 12e of the lug structures 12b provide a springy surface against which the strip ends 15a bear, said ends being frictionally retained in any swinging position without requiring a tight clamping connection thus practically eliminating wear on said strip ends 15a.

As shown in Fig. 3, the side surfaces 15c of the pairs of strips 15a, facing each other may be concaved and the contiguous side surfaces 24e of the wooden section member 24, correspondingly convexed to provide a larger and better clamping action thus permitting the formation of a more rigid support and to positively guide the sliding movement of said member 24 between the strips 15 thereby eliminating possible accidental displacement should the cap flanges 26a become defective.

Figs. 8 and 9 show a modified construction of the invention in the form of a camera tripod 110 having a two section leg instead of three section described above for tripod 10. Here the pairs of spaced strips 115 are pivotally mounted by the ends 115a to the head 12 by means of the bolts 16 passing through the lug sections 12a in the same manner as described above in the construction of tripod 10. The strips 115 may each have a crescent shaped cross-section, the concaved portion 115c thereof being of such shape and size as to fit the outer surface of the section tubing 25. The other or free end 115b of the strips may be provided with metallic pieces 119 for reinforcing same. Said pieces are interconnected by the metallic shaped band 120 which has its adjacent ends 120a secured in any suitable manner as by means of screws 21 to the outer side of one of the pieces 119. The side of said band 120b opposite said ends 120a may be provided with a pierced boss 120c which is adapted to retain a nut into which the wing screw 23 extends in the same manner as described above in the construction of tripod 10. Said wing screw 23 has its inner end provided with a pressure disc 23a and forms with the band 120, a mechanism for clamping the section tubing 25.

The tripod 110 is set up and collapsed in the same manner as described above for the tripod 10.

It will thus be seen that there is provided portable supporting devices whereby the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a portable supporting device of the character described, a head, spaced strips having ends pivoted to said head, a non-metallic section member mounted for sliding movement between said strips, means mounted on the ends of said strips opposite the pivoted ends for flexing said ends to clamp said member between said strips, said member having an axially extending passage therethrough adapted to receive a tubing leg section for sliding movement, and a cap mounted on the end of said member between said strips forming a closure for said passage.

2. In a portable supporting device of the character described, a head, spaced strips having ends pivoted to said head, a non-metallic section member mounted for sliding movement between said strips, flexing means mounted on the ends of said strips opposite the pivoted ends thereof for clamping said member between said strips, said member having an axially extending passage therethrough adapted to receive a tubing leg section for sliding movement, a cap mounted on the end of said member between said strips forming a closure for said passage, said flanges extending from opposite edges from said cap engaging with said strips for guiding and retaining said member against leaving the space between said strips.

In testimony whereof I affix my signature.

HERMAN NEUWIRTH.